United States Patent [19]

Ribarits et al.

[11] Patent Number: 6,080,810
[45] Date of Patent: Jun. 27, 2000

[54] SEMICONDUCTING POLYMER COMPOSITION AND CABLE SHEATHING COMPRISING THE SAME

[75] Inventors: Elisabeth Ribarits, Spekeröd; Ola Fagrell, Stenungsund, both of Sweden; Lars Isaksson, Bucks, United Kingdom; Bernt-Åke Sultan; Gustav Åkermark, both of Stenungsund, Sweden

[73] Assignee: Borealis A/S, Lyngby, Denmark

[21] Appl. No.: 09/267,988

[22] Filed: Mar. 12, 1999

Related U.S. Application Data

[63] Continuation of application No. PCT/SE97/01196, Jul. 2, 1997.

[30] Foreign Application Priority Data

Oct. 2, 1996 [SE] Sweden .................................. 9603595

[51] Int. Cl.[7] ...................................................... C08K 3/03
[52] U.S. Cl. ............................................ 524/496; 524/495
[58] Field of Search ..................................... 524/495, 496

[56] References Cited

U.S. PATENT DOCUMENTS

| | | |
|---|---|---|
| 4,297,310 | 10/1981 | Akutsu et al. . |
| 4,351,876 | 9/1982 | Doi et al. . |
| 4,397,981 | 8/1983 | Doi et al. . |
| 4,413,066 | 11/1983 | Isaka et al. . |
| 4,446,283 | 5/1984 | Doi et al. . |
| 4,456,704 | 6/1984 | Fukumura et al. . |
| 5,108,657 | 4/1992 | Demay et al. . |

FOREIGN PATENT DOCUMENTS

| | | |
|---|---|---|
| 0 420 271 A1 | 4/1991 | European Pat. Off. . |
| 0 420 731 | 4/1991 | European Pat. Off. . |
| 0 520 752 | 12/1992 | European Pat. Off. . |
| 0 520 752 A1 | 12/1992 | European Pat. Off. . |
| 2 181 437 | 4/1987 | United Kingdom . |

OTHER PUBLICATIONS

File WPI, Derwent accession No./ 95–258175, Yazaki Corp: "Resin Compsn. for semi–electro–conductive layer of high voltage insulated cable–contains ethylene–vinyl acetate copolymer and electroconductive–carbon TM–black", JP, A, 7161225, 950623, DW9534.

*Primary Examiner*—Edward J. Cain
*Attorney, Agent, or Firm*—Merchant & Gould P.C.

[57] ABSTRACT

A semiconducting, cross-linkable and silane-containing polymer composition is disclosed, as is a cable sheathing for an electric cable which, as semiconducting layer, includes the cross-linked polymer composition. The composition is based on ethylene and contains carbon black. Preferably, the polymer is a terpolymer of ethylene, a (meth)acrylate of an alcohol having 1–8 carbon atoms, such as methyl, ethyl or butyl acrylate, and an unsaturated silane compound, such as vinyltrimethoxy silane. The polymer composition is distinguished by the fact that the carbon black has a specific surface area of approximately 30–80 $m^2/g$, which reduces the problems associated with undesirable cross-linking of the polymer composition, for instance in extrusion.

10 Claims, No Drawings

SEMICONDUCTING POLYMER COMPOSITION AND CABLE SHEATHING COMPRISING THE SAME

This application is a Continuation of International Application Serial No. PCT/SE97/01196, file Jul. 2, 1997.

This invention relates to a semiconducting, crosslinkable and silane-containing polymer composition, which is based on ethylene and at least one monomer copolymerisable therewith and which contains carbon black. The invention further concerns a cable sheathing for an electric cable, which includes at least one semiconducting layer based on the polymer composition.

As mentioned above, the polymer composition according to the invention is crosslinkable, i.e. it is intended to be crosslinked when used, for instance as semiconducting layer in a cable sheathing.

It is known to crosslink different polymers. The crosslinking improves the properties of the polymer, such as its mechanical strength, chemical, abrasion and heat resistance. Also polymers normally regarded as thermoplastics and not crosslinkable can be crosslinked by the introduction of crosslinkable groups. An example thereof is the crosslinking of polyolefins, such as polyethylene, with the aid of peroxides. In peroxide crosslinking, a peroxide compound is admixed to the polymer composition, and the crosslinking is initiated by heating, such that the peroxide is decomposed to form radicals. It is furthermore known to crosslink polyolefins, such as polyethylene, by introducing a silane compound as crosslinkable group. The silane compound may be introduced e.g. by grafting it onto the prepared polyolefin or by copolymerisation of the olefin and the silane compound. For more information on this technique, reference is made to U.S. Pat. Nos. 4,413,066, 4,297,310, 4,351,876, 4,397,981, 4,446,283 and 4,456,704.

As appears from the above patent specifications, polymer production involving grafting of the silane compound has its problems, both as regards the production itself and the properties of the material produced. These problems are counteracted by producing the crosslinkable silane polymer by copolymerisation. According to the invention, a silane-containing copolymer material is therefore preferably used as silane-containing polymer material.

In crosslinkable polymer compositions, it is essential that crosslinking only takes place after the composition has been moulded, for instance by extrusion or with the aid of some other moulding equipment, since premature crosslinking or scorching in the moulding apparatus (the extruder) makes it impossible to maintain a uniform production capacity, and the quality of the resulting product will furthermore be unsatisfactory. An incipient crosslinking or scorching already in the extruder entails gelation and adhesion of polymer gel to the surfaces of the equipment, with ensuing risks of clogging. To counteract this, the equipment has to be cleaned of adhering polymer gel, and for every cleaning operation, the equipment has to be shut down, which entails a fall in production.

Another disadvantage is that any gel lumps which do not clog the moulding equipment are discharged and thus occur in the product in the form of disfiguring and unwanted clots.

In electric cables, the presence of gel clots due to scorching is unacceptable. In electric cables for medium voltage and high voltage, i.e. approximately 6 kV and above, use is, for instance, made of a cable sheathing comprising an inner semiconducting layer arranged round the cable conductor and containing carbon black, an insulating intermediate layer arranged round the inner layer, an outer semiconducting layer arranged round the insulating intermediate layer and containing carbon black and, at least in Europe, mostly an external protective layer of sheathing. The semiconducting layers are thin, and any gel clots found therein will appear as irregularities impairing the properties of these layers, for instance as regards their Water Tree Resistance (WTR).

It should here be emphasised that, although scorch is a more or less general problem for all types of crosslinkable polymer compositions, the causes behind are quite different depending on type of crosslinking reaction. Thus, peroxide initiated, radical propagated crosslinking reactions are mainly sensitive to choice of peroxide and thereby choice of extrusion temperature. Silane crosslinkable compositions, on the other hand, are foremost sensitive to moisture in combination with silane condensation catalysts, both these reactants often inadvertently being present. The specific type of scorch problem with which the present invention deals is therefore unique for silane crosslinkable compositions.

Silane polymers, which are used in the present invention, are crosslinked by moisture curing, in which the silane groups of the polymer are hydrolysed under the influence of water, whereby alcohol and silanol groups are formed. Then, the silanol groups are crosslinked under the action of a silanol condensation catalyst in a condensation reaction, while splitting off water.

The presence of water and/or substances that may act as silanol condensation catalysts in the silane polymer may accordingly result in an undesirable premature crosslinking of the polymer when heat-moulded, for instance by extrusion. Such undesirable premature crosslinking of the silane polymer has previously posed an important problem. In order to alleviate or solve this problem, one has tried to remove or neutralise the various sources that may give rise to premature crosslinking. Thus, the silane polymer may, before and during the extrusion, be handled essentially in the absence of moisture, thereby to prevent a hydrolysis of the silane groups, the polymer being contacted with moisture or water only after the extrusion. Furthermore, the silanol condensation catalyst may not be added until after the extrusion of the silane polymer, or the silanol condensation catalyst may be provided in a layer separate from the silane polymer during the extrusion so that the catalyst may migrate into the silane polymer after the extrusion. Moreover, precuring retarders may be added to the polymer composition.

Whether used separately or in combination, these prior-art measures have constituted a considerable improvement and have, in most cases, much reduced the problem associated with premature crosslinking of silane polymers. Nevertheless, there remain applications where the problem of premature crosslinking has been found to be difficult to solve. One such important application concerns semiconducting silane compositions containing carbon black as the agent intended to achieve the aimed at electrical conductivity. Such semiconducting silane compositions, which have high contents of carbon black in the order of approximately 20–50% by weight and with a surface area normally of about 140–250 m²/g in order to obtain the electrical conductivity required, result in problems with poor storage stability and undesirable premature crosslinking in extrusion. Even though these problems are, to a certain extent, alleviated by the measures enumerated above, it is highly desirable to further reduce the risk of premature crosslinking in the extrusion of semiconducting silane polymer compositions.

One theory that has been put forward is that the moisture normally found in carbon black is at the root of the problem with premature crosslinking. The smaller the amount of carbon black found in the composition, the smaller the amount of moisture supplied. Accordingly, a reduction of the content of carbon black should result in less premature crosslinking. The carbon-black content can be reduced by resorting to a special kind of carbon black which is highly conductive and only need be supplied in a minor amount in the order of approximately 7–15% by weight. Even though this measure results in a certain improvement, this is far from sufficient, and the utilisation of highly-conductive carbon black involves other drawbacks. Thus, it is extremely difficult to compound highly-conductive carbon black homogeneously in the polymer composition, primarily because highly-conductive carbon black has a large surface area in the order of 1000 m²/g or more. Furthermore, considerable compounding results in increasing shear forces, thus increasing the risk of a decomposition of the carbon-black particles, which in turn impairs the electrical conductivity.

Thus, the problem at issue cannot be solved by using highly-conductive carbon black. Neither can it be solved by using a smaller amount of conventional carbon black, since the electrical conductivity required in the semiconducting polymer composition is then not achieved.

According to the invention, it has now surprisingly been found that this problem can be solved, and the undesirable premature crosslinking of semiconducting crosslinkable and silane-containing polymer compositions be reduced, by using, in the composition, a special type of carbon black, more specifically carbon black having a specific surface area of approximately 30–80 m²/g.

Thus, carbon black of this type is homogeneously dispersed in the polymer composition much more easily than highly-conductive carbon black. Furthermore, it is less expensive and results in a much more even surface of the finished material. Moreover, the finished material will have an excellent storage stability.

The present invention thus provides a semiconducting, crosslinkable and silane-containing polymer composition which is based on ethylene and contains carbon black, said composition being characterised in that the carbon black has a surface area of approximately 30–80 m²/g.

Preferably, the carbon black has a surface area of approximately 50–70 m²/g.

According to the invention, the amount of carbon black in the polymer composition is preferably approximately 20–50% by weight, and most preferred approximately 30–45% by weight.

The inventive polymer composition is based on ethylene, and may in addition contain one or more comonomers, as indicated in more detail below. It is preferred that a (meth) acrylate of an alcohol having 1–8 carbon atoms, especially methyl, ethyl or butyl acrylate, is present as a comonomer, in which case it makes up approximately 0.5–80 mole % of the ethylene-based polymer.

According to the invention, it is preferred that the silane compound forming part of the silane-containing polymer composition is incorporated by copolymerisation and that it makes up approximately 0.001–15% by weight of the ethylene-based polymer.

The invention further provides a cable sheathing for an electric cable, said sheathing being characterised in that it comprises at least one semiconducting layer, which is made up of a crosslinked polymer composition of the above type.

Further characteristics and advantages of the present invention will appear from the following description and the appended claims.

It should here be mentioned that DE 35 33 508 teaches the use of, inter alia, carbon black of the type employed in the present invention, but for another purpose. According to the DE specification, which relates to cable sheathings and protective tubes made from crosslinkable silane polymers, it is possible to increase the resistance of the material to ultraviolet radiation or increase the mechanical stability at elevated temperatures by admixing non-hygroscopic soot of a high structure, such as Acetylenschwarz Y, Denkablack or Akzo-Russ Ketjen EC. However, the amount of carbon black employed is but 1.5–15% by weight, which does not suffice to make the polymer semiconducting. Thus, DE 35 33 508 discloses neither the problem nor the solution according to the present invention.

As mentioned in the foregoing, the crosslinkable polymer material according to the invention is a silanecontaining polymer. This polymer is an ethylene homopolymer or ethylene copolymer, to which the silane compound is attached by grafting or, which is actually preferred, by copolymerisation. Since the polymer preferably is an ethylene copolymer obtained as a result of the copolymerisation of ethylene, a silane monomer and, optionally, one or more additional comonomers which are copolymerisable with ethylene and the silane monomer, the invention will in the following be described in more detail with regard to this preferred embodiment thereof.

The unsaturated silane compound may be represented by the formula

wherein R is an ethylenically unsaturated hydrocarbyl or hydrocarbyloxy group, R' is an aliphatic, saturated hydrocarbyl group, Y is a hydrolysable organic group, and n is 0, 1 or 2. If there is more than one Y group, these groups do not have to be identical.

Special examples of the unsaturated silane compound are those wherein R is vinyl, allyl, isopropenyl, butenyl, cyclohexenyl or gamma-(meth)acryloxypropyl, Y is methoxy, ethoxy, formyloxy, acetoxy, propionyloxy or an alkyl or arylamino group, and R' is a methyl, ethyl, propyl, decyl or phenyl group.

An especially preferred unsaturated silane compound is represented by the formula

wherein A is a hydrocarbyl group having 1–8 carbon atoms, preferably 1–4 carbon atoms.

The most preferred compounds are vinyltrimethoxy silane, vinyl dimethoxyetrhoxy silane, vinyltriethoxy silane, gamma-(meth)acryloxypropyl silane, and vinyltriacetoxy silane.

The monomer which is copolymerisable with ethylene and the unsaturated silane compound is preferably selected from:
(a) vinylcarboxylate esters, such as vinyl acetate and vinyl pivalate, (b) (meth)acrylates, such as methyl(meth)acrylate, ethyl(meth)acrylate, butyl(mesh)acrylate, (c) (meth)acrylic acid derivatives, such as (meth)acrylonitrile and (meth) acrylamide, and (d) vinyl ethers, such as vinylmethyl ether and vinylphenyl ether. Of these comonomers, it is preferred to use vinyl esters of monocarboxylic acids having 1–4 carbon atoms, such as vinyl acetate, and (meth)acrylates of alcohols having 1–8 carbon atoms, such as methyl(meth) acrylate. Methyl, ethyl and butyl acrylate are especially preferred comonomers. Two or more such olefinically unsaturated compounds may be used together. As used herein, the term "(meth)acrylic acid" is meant to encompass acrylic acid as well as methacrylic acid. The polymer may contain up to approximately 80 mole % of the comonomer (a)–(d), preferably approximately 2–80 mole %, and most preferred approximately 4–60 mole %.

According to the invention, the silane-containing polymer contains 0.001–15% by weight of the silane compound, preferably 0.01–5% by weight, and especially preferred 0.1–3% by weight.

In view of the incorporation of carbon black in the polymer composition, it is, in accordance with the invention, preferred that the polymer contains, apart from ethylene and the silane compound, at least one additional monomer chosen from the comonomers (a)–(d) mentioned above. Apart from facilitating the admixture of carbon black, these comonomers contribute to imparting the desired peelability to the polymer composition, this being an important quality of sheathing layers for cables. As already mentioned, it is especially preferred that the polymer is a terpolymer of ethylene, silane monomer and a third comonomer, which is chosen from $C_3$–$C_8$ 1-olefins, vinyl esters of monocarboxylic acids having 1–4 carbon atoms, preferably vinyl acetate, and (meth)acrylates of alcohols having 1–8 carbon atoms, such as methyl(meth)acrylate, ethyl(meth)acrylate, propyl (meth)acrylate or butyl(meth)acrylate. Copolymers of ethylene, silane monomer and methyl, ethyl or butyl acrylate are currently the most preferred.

In order to achieve the desired electrical conductivity and make the composition semiconducting, the polymer composition according to the invention contains carbon black. The invention is distinguished by the fact that the carbon black incorporated in the composition has a specific surface area, measured by nitrogen adsorption according to the BET method, of approximately 30–80 $m^2/g$, preferably approximately 50–70 $m^2/g$. When use is made of carbon black having a surface area exceeding approximately 80 $m^2/g$, there arise problems with undesirable premature crosslinking (scorching), and the polymer composition will thus present an uneven and unsatisfactory surface after crosslinking. When use is made of carbon black having a surface area below approximately 30 $m^2/g$, the electrical conductivity is unsatisfactory, and an excessive amount of carbon black is required to obtain an acceptable conductivity. The amount of carbon black in the polymer composition according to the invention may vary within wide limits and suitably is in the range of approximately 20–50% by weight, preferably approximately 30–45% by weight. An amount of carbon black below approximately 20% by weight will result in an unsatisfactory electrical conductivity, and it is difficult to admix to the composition an amount of carbon black exceeding approximately 50% by weight.

It should here be mentioned that, in spite of the fact that such a high content of carbon black as approximately 20–50% by weight is used in accordance with invention, there do not arise any problems with undesirable premature crosslinking, as is the case when use is made of the same amount of conventional carbon black. On the contrary, the carbon black according to the invention counteracts premature crosslinking, which is an indication that it is not, contrary to previous belief, the moisture content of the carbon black that causes the problems with premature crosslinking, but the cause is to be found elsewhere. However, it is not fully explained why carbon black according to the invention, having a specific surface of approximately 30–80 $m^2/g$, yields results superior to those of other types of carbon black, Apart from the components mentioned above, the crosslinkable polymer may, as is usually the case with polymer compositions, contain various additives, such as miscible thermoplastics and rubbers, stabilisers, lubricants, fillers and colouring agents.

The copolymerisation of ethylene, the unsaturated silane compound and, optionally, additional comonomers may be carried out under any suitable conditions resulting in the formation of the desirable polymer.

As indicated in the foregoing, the crosslinking of the silane polymer is carried out with the aid of a catalyst, to be more specific a silanol condensation catalyst. In general, all silanol condensation catalysts may be used in the present invention, and the silanol condensation catalyst employed is, to be more specific, selected from carboxylates of metals, such as tin, zinc, iron, lead and cobalt, organic bases, inorganic acids and organic acids.

Special examples of silanol condensation catalysts are dibutyltin dilaurate, dibutyltin diacetate, dioctyltin dilaurate, stannous acetate, stannous caprylate, lead naphthenate, zinc caprylate, cobalt naphthenate, ethyl amines, dibutyl amine, hexyl amines, pyridine, inorganic acids, such as sulphuric acid and hydrochloric acid, and organic acids, such as toluenesulphonic acid, acetic acid, stearic acid and maleic acid, tin carboxylates being especially preferred catalyst compounds.

The amount of silanol condensation catalyst employed is generally in the order of 0.001–2% by weight, preferably 0.005–1% by weight, and especially 0.01–0.5% by weight, of the amount of silane-containing polymer in the composition.

In order to further elucidate the invention and its advantages, here follows an illustrative Example.

EXAMPLE

A terpolymer composed of ethylene, butyl acrylate and vinyltrimethoxy silane and containing 17% by weight of butyl acrylate and 2% by weight of vinyltrimethoxy silane was divided into seven parts of equal size, and seven different types of carbon black, having different specific surface areas (determined by nitrogen adsorption in accordance with BET), were admixed to the respective polymer parts in order to produce semiconducting polymer compositions. The admixture of carbon black was carried out in an extruder of the type Buss Kokneter. The polymer composition was extruded to a tape having a thickness of 1.5 mm and a width of 50 mm. The resulting tapes were then subjected to ocular inspection in order to assess the appearance of the respective surfaces. Undesirable crosslinking in the extruder results in a rough and uneven surface, whereas the absence of such crosslinking results in a smooth surface. The appearance of the surface was assessed in accordance with a scale from 1 to 7, 1 being the best value indicating a smooth surface and 7 being the poorest value indicating a rough and uneven surface. A tape appearance rating equal to or above 5 is not acceptable for use as semi-conductive layers in power cables. The results of these tests are indicated in the Table below.

TABLE

| Test No. | 1 | 2 | 3 | 4 | 5 | 6 | 7 | 8 | 9 |
|---|---|---|---|---|---|---|---|---|---|
| Carbon black type, % by weight | Furnace 38 | ENSACO 36 | ENSACO 34 | Acetylene 36 | Furnace 38 | Furnace 38 | Furnace 39 | Ketjen 13 | Ketjen 9 |
| Surface area, m$^2$/g | 38 | 55 | 65 | 63 | 83 | 126 | 150 | 950 | 1250 |
| Appearance of tape surface | 2 | 1 | 1 | 1 | 5 | 5 | 7 | 5 | 5 |
| Volume resistivity, ohm cm | 31 | 10 | 7 | 17 | 23 | 13 | 11 | 44 · 10$^3$ | 520 |

It is evident from this Table that carbon black having a surface area of approximately 30–80 m$^2$/g in accordance with the invention (Tests 1–4) results in no premature crosslinking or but insignificant premature crosslinking, whereas carbon black having a surface area exceeding about 80 m$^2$/g results in undesirable crosslinking of considerable proportions.

In addition to the above tests, the storage stability was tested for the polymers according to tests, 2, 8 and 9 above. The tests were carried out by subjecting pellets of the carbon black containing polymers to an atmosphere of 23° C. and 50% relative humidity for an extended period of time, whereafter a tape was made of the polymer and evaluated as above. The result of this storage stability test was that the polymer according to test 2, i.e. according to the invention, had an appearance rating of 1 after 52 weeks of storage, while the polymers according to tests 8 and 9 both had appearance ratings of 7 after only 45 weeks of storage. It is thus evident, that while the polymer composition according to the invention did not change its appearance rating during storage, i.e. it was storage stable, the comparative polymer compositions 8 and 9 changed their already poor ratings from 5 to 7.

What is claimed is:

1. A semiconducting, moisture curable, silane crosslinkable polymer composition comprising ethylene and carbon black, wherein the carbon black has a surface area of approximately 30–80 m$^2$/g.

2. A polymer composition as claimed in claim 1, wherein the carbon black has a surface area of approximately 50–70 m$^2$/g.

3. A polymer composition as claimed in claim 1, wherein the composition comprises approximately 20–50% by weight carbon black.

4. A polymer composition as claimed in claim 3, wherein the composition comprises approximately 30–45% by weight carbon black.

5. A polymer composition as claimed in claim 1, comprising a copolymer of ethylene and at least one monomer which is copolymerizable with ethylene and which comprises a (meth)acrylate of an alcohol having 1–8 carbon atoms.

6. A polymer composition as claimed in claim 5, comprising a monomer copolymerizable with ethylene that is selected from the group consisting of methyl acrylate, ethyl acrylate and butyl acrylate.

7. A polymer composition as claimed in claim 5, wherein approximately 0.5–80 mole % of the ethylenebased polymer comprises (meth)acrylate.

8. A polymer composition as claimed in claim 1, wherein the composition comprises a copolymer of ethylene and at least one monomer that is copolymerizable with ethylene, wherein the at least one monomer that is copolymerizable with ethylene comprises an unsaturated hydrolysable silane compound.

9. A polymer composition as claimed in claim 1, wherein the composition comprises approximately 0.001–15% by weight of silane compound, based on the polymer.

10. A cable sheathing for an electric cable comprising at least one semiconducting layer of the silane crosslinked polymer composition of claim 1.

* * * * *

UNITED STATES PATENT AND TRADEMARK OFFICE
CERTIFICATE OF CORRECTION

PATENT NO. : 6,080,810
DATED : June 27, 2000
INVENTOR(S) : Ribarits et al.

It is certified that error appears in the above-identified patent and that said Letters Patent is hereby corrected as shown below:

Column 1,
Line 6, "file" should read -- filed --

Column 5,
Line 4, "dimethixyetrhoxy" should read -- dimethoxyethoxy --

Signed and Sealed this

Twenty-third Day of October, 2001

Attest:

*Nicholas P. Godici*

NICHOLAS P. GODICI
*Attesting Officer*     *Acting Director of the United States Patent and Trademark Office*